United States Patent
Eibach et al.

(10) Patent No.: US 7,356,832 B1
(45) Date of Patent: Apr. 8, 2008

(54) SECURITY FOR NETWORK-CONNECTED VEHICLES AND OTHER NETWORK-CONNECTED PROCESSING ENVIRONMENTS

(75) Inventors: Wolfgang G Eibach, Holzgerlingen (DE); Mark P Nuttall, Carlton (AU); Matthias Gruetzner, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/501,756

(22) Filed: Feb. 10, 2000

(30) Foreign Application Priority Data

Jul. 1, 1999 (GB) .................................. 9915272.0

(51) Int. Cl.
*G06F 7/04* (2006.01)
*G06F 7/00* (2006.01)

(52) U.S. Cl. .............................. 726/2; 726/11; 701/29; 701/36

(58) Field of Classification Search ........ 717/168–178; 701/29–49; 340/500, 514; 726/11–15, 2, 726/4; 705/16
See application file for complete search history.

(56) References Cited

U.S. PATENT DOCUMENTS

| | | | |
|---|---|---|---|
| 5,365,436 A * | 11/1994 | Schaller et al. ............... | 701/33 |
| 5,442,553 A * | 8/1995 | Parrillo ........................ | 455/420 |
| 5,706,191 A * | 1/1998 | Bassett et al. ................. | 700/9 |
| 5,732,074 A * | 3/1998 | Spaur et al. ................. | 370/313 |
| 5,787,367 A * | 7/1998 | Berra ............................ | 701/1 |
| 5,890,080 A * | 3/1999 | Coverdill et al. ............. | 701/29 |
| 5,938,708 A * | 8/1999 | Wallace et al. ............... | 701/48 |
| 6,060,994 A * | 5/2000 | Chen .......................... | 340/521 |
| 6,123,174 A * | 9/2000 | Elkin et al. ................... | 184/1.5 |
| 6,202,066 B1 * | 3/2001 | Barkley et al. ................. | 707/9 |
| 6,236,909 B1 * | 5/2001 | Colson et al. ................. | 701/1 |
| 6,263,268 B1 * | 7/2001 | Nathanson ................... | 701/29 |
| 6,427,202 B1 * | 7/2002 | Richardson et al. .......... | 712/32 |
| 2002/0037004 A1 * | 3/2002 | Bossemeyer et al. ....... | 370/356 |
| 2004/0153656 A1 * | 8/2004 | Cluts et al. ................. | 713/186 |

OTHER PUBLICATIONS

Serughett (Marc Serughett, "OSEK: a super-small kernel for deeply embedded applications?", 1999), http://www.omimo.be/magazine/99q4/isi.pdf.*

(Continued)

*Primary Examiner*—Kambiz Zand
*Assistant Examiner*—Peter Poltorak
(74) *Attorney, Agent, or Firm*—Joseph E. Bracken; Winstead PC

(57) ABSTRACT

A method and apparatus provide security for a network-connected vehicle (or other networked environment) in which a predefined set of permitted operations relating to protected resources can be initiated remotely from elsewhere in the network, while security is maintained for the protected resources (for example, an engine performance optimisation control unit or air conditioning control unit within a vehicle) by preventing remote initiation of any other operations on a data processing unit which is connected to the protected resources. One of a pair of gateway components runs on each of two data processing units within the vehicle (or other environment), the first processing unit being connected to the vehicle's device control units and the second processing unit being connected to the external network. The gateway components control the types of communications which can be passed from the network-connected side to the first processing unit such that only permitted operations can be requested and no unauthorised operations can be initiated remotely.

5 Claims, 2 Drawing Sheets

OTHER PUBLICATIONS

Pfleeger (Charles P. Pfleeger, "Security in computing", 2nd edition, 1996, ISBN: 0133374866), 427-434.*

Translation of the Korean Patent No. 0153605 "Remote vehicle management system" published on May 30, 1997.*

Pfleeger (Charles P. Pfleeger, "Security in computing", 2nd edition, 1996, ISBN: 0133374866), p. 426-434.*

* cited by examiner

SECURITY FOR NETWORK-CONNECTED VEHICLES AND OTHER NETWORK-CONNECTED PROCESSING ENVIRONMENTS

FIELD OF INVENTION

The present invention relates to provision of security for control systems of vehicles which have access to computer networks, such as vehicles having a mobile connection to the Internet. The invention also has application for improving security for network-connected data processing resources within a home or office environment and any other processing environment which has critical resources which must be protected from unauthorised access.

BACKGROUND

It is known in the art to interconnect a vehicle's internal device control units via field buses such as CAN, J1850, VAN, and others. These device control units are typically inaccessible from outside the vehicle. Protection from unauthorised access from outside is essential to ensure safe operation, since the device control units directly access safety-sensitive hardware such as the vehicle braking system.

Recent attention has been given to the idea of vehicles being connected via a mobile link to networks such as the Internet, to enable drivers and passengers to access traffic and navigation information for example, and to support emergency and breakdown calls from the vehicle. In the past, these applications have not needed to interact with the vehicle's internal network which interconnects the electronic control units. A typical protocol for these communication functions is the upcoming Global Automotive Telematic Standard (GATS).

A serious security problem arises as soon as Internet access, or other network access, is desired to enable operations relating to the vehicle's internal electronic device control units to be initiated by users or programs elsewhere in the network. For example, there may be requirements to allow an authorised breakdown service company or the vehicle manufacturer to be able to request specific operational data to diagnose problems and then to remotely initiate corrective operations. If remote access to the vehicle's internal buses is possible, then there is a risk of hackers interfering with the vehicle's internal communications, and changing system parameters or triggering operations which could lead to control unit faults. There is also a risk of hackers obtaining confidential information from the internal control units. There is currently no known solution to these problems which applies to vehicles.

Additionally, if software can be downloaded via the network links, there is a potential for such downloaded software to monopolize the available hardware resources or the vehicle's internal communication bus. This could impact the performance of critical operations.

Similar problems arise in non-vehicle environments, whenever there is a need to achieve both the protection of resources from unauthorised operations and the ability to invoke certain operations relating to the protected resources from elsewhere in a network.

SUMMARY OF INVENTION

The present invention provides network access to and from a vehicle including access for applications which need to communicate with the vehicle's internal device control units, implementing this by using at least two physically separate processing units within the vehicle. A first processing unit handles operations which affect the vehicle's internal device control units and a second processing unit handles communications with the external network, and the only connection between the two processing units is via a secure gateway. This gateway, which is preferably implemented by means of a gateway software component on each of the two processing units, restricts the types of communication which are possible across this connection. This prevents unauthorised communications with device control units and controls which operations in the first processing unit can be triggered by communications from the second processing unit which were initiated from elsewhere in the network.

In a preferred embodiment, a gateway software component running on the first processing unit holds a list of a predefined set of permitted messages, and messages received at this first processing unit from the second processing unit are checked against the list and only the permitted messages are passed on to the vehicle's device control units. Any other received messages are deleted (possibly with a failure report being sent to the second processing unit for forwarding across the network to whoever initiated the non-permitted communication).

The first processing unit is preferably running a static, real time operating system, such as an operating system implementing the OSEK standard. OSEK is an abbreviation of a German term which translates as "Open systems and the corresponding interfaces for automotive electronics", and was founded in 1993 as a joint project of the German automotive industry aiming at an industry standard for an open architecture for distributed control units in vehicles. A static operating system can only perform specific predefined operations in response to predefined messages, these operations being fully defined at configuration time. Therefore, static operating systems are not capable of being modified by any software downloaded via the vehicle's network connections and there are no decisions to make at run time regarding how to process requests. This is advantageous since it ensures control of the types of operations which can be triggered by communications sent to the first processing unit. Static operating systems can be limited to the use of reliable, fully tested code such that there is a low likelihood of failures as well as prevention of interference by malicious code and hacking.

A real time operating system is essential for the operation of certain types of applications affecting device control units, which the invention preferably supports, such as an engine efficiency optimisation application which causes a control unit for the engine to make fine adjustments to the time which valves are open or an engine diagnostics application which needs to complete a particular reading before a valve is opened.

The second processing unit is preferably running a security manager which handles authentication of requests received from the network. A number of authorised parties have predefined permissions which are specific to them. The security manager on the second processing unit checks whether a request is received from one of the authorised parties and whether it matches their respective defined permissions before passing the request to its local gateway component for forwarding to the first processing unit.

Thus, the preferred embodiment of the invention provides a two-stage security control. The first stage includes an authentication process and then the second stage limits the operations which can be triggered by external communications so as to prevent any manipulation of software or hardware of the system which runs applications affecting the vehicle's safety-critical components. A hacker who successfully overcomes the checking at the first stage (i.e. the security checks which are preferably implemented at the second processing unit) is nevertheless prevented from manipulating any safety-sensitive vehicle components (which are connected to the first processing unit).

Furthermore, the invention inhibits downloaded code from monopolizing the hardware resources or the vehicles internal communication buses.

The invention's separation of processing operations and control of message flows between systems such that unauthorised operations cannot be performed on the system which is connected to safety-critical device control units also has applications for the 'networked-home'. For example, a user wishing to download entertainment software and programme content to their home computer needs to be able to prevent hacking into their home security system.

Thus, while the invention addresses a significant security problem for networked-vehicles, the invention is also clearly applicable to other environments in which there are requirements both for communications with an external network and for protection of embedded data processing resources from unauthorised network access. With the increasing pervasiveness of embedded processing capabilities (within products such as refrigerators, washing machines), and an increasing trend to providing Internet access for products with embedded processing systems, the security benefits of the present invention are widely applicable.

The present invention is differentiated from known firewalls which filter which packets of data can be sent. The present invention enables shielding from dangerous operations by checking requests after they have been sent to the data processing unit which connects to the vehicle's internal device control units' communication bus, and only permitting the performance of a fixed set of operations. The invention thus goes a step further than filtering the messages which can be sent, by filtering request messages after they have been sent but prior to task execution.

BRIEF DESCRIPTION OF DRAWINGS

The invention will now be described in more detail, by way of example only, with reference to the accompanying drawings in which.

DESCRIPTION OF PREFERRED EMBODIMENT

Figure 1:
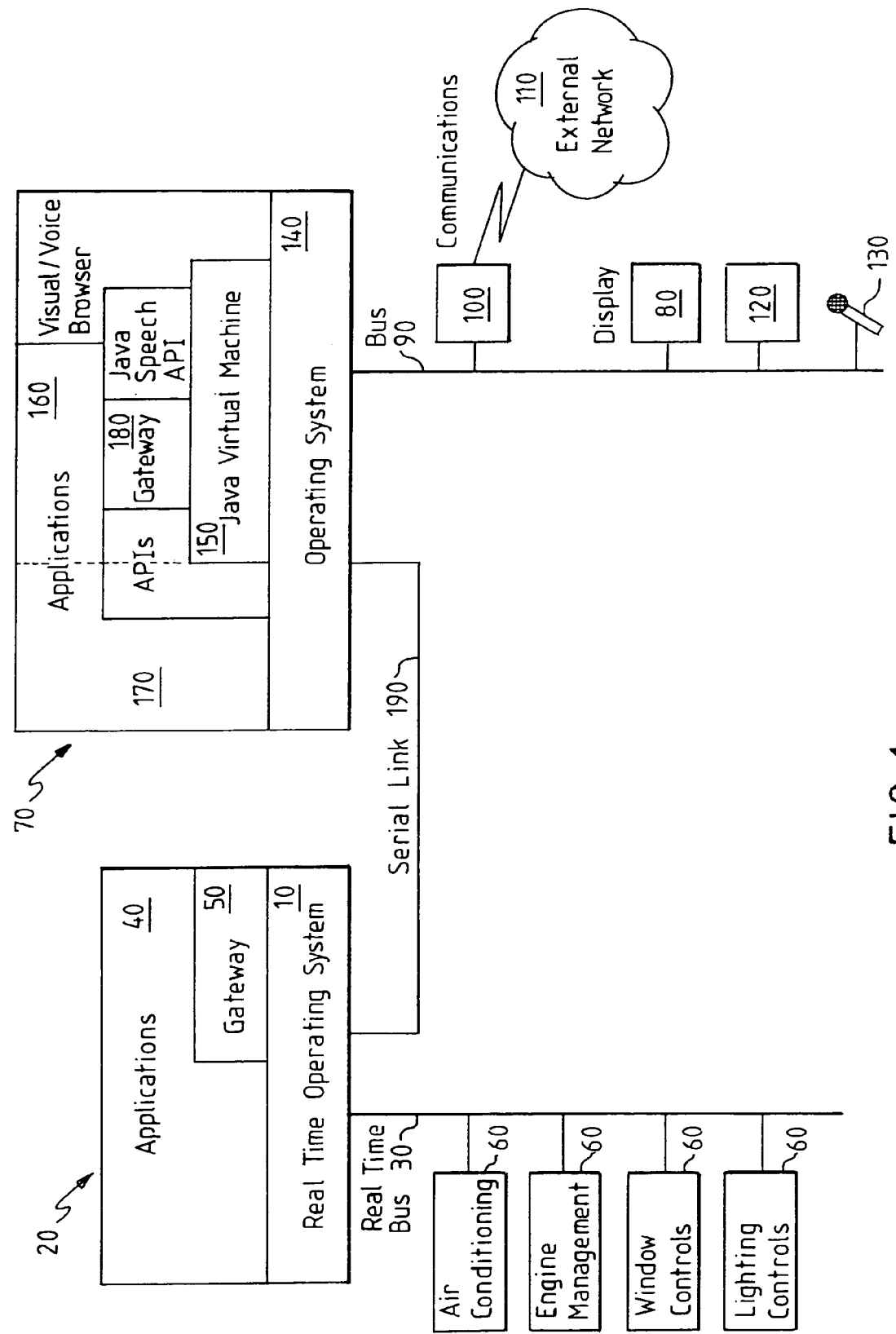
FIG. 1 is a schematic representation of a vehicle's data processing and communications network according to a first embodiment of the invention, showing the separation of data processing units which communicate via a secure gateway.

As shown schematically in FIG. 1, a vehicle can be provided with communication and data processing resources which allow management of and analysis of many devices within the vehicle. A first static, real-tire operating system (RTOS) 10 runs on a first processing unit 20 which is connected to the vehicle's internal communication bus 30 (for example CAN, VAN). A number of real-time application programs 40 and a first gateway software component 50 run on top of this operating system 10. For example, the application programs 40 may include applications for: air conditioning or heating control; engine efficiency optimisation and diagnostics; management of anti-lock braking system (ABS); window, seat and mirror movement; and control of main lights and indicator lights. Each of these applications controls or obtains data from one or more device control units 60 connected to the vehicle's internal communication bus 30 which connects to the first processing unit 20 (hereafter referred to as 'processing unit A').

A second processing unit 70 (hereafter, 'processing unit B') is connected to a graphic display apparatus 80, and via a communication bus 90 to a GSM mobile telephone 100 providing the capability for communications with external networks 110, speakers 120 and a microphone 130, and runs a second real time operating system 140. A Java Virtual Machine (JVM) 150 runs above this second operating system, and a number of Java™ applications 160 use the services of the JVM. The Java applications may include applications for: in-vehicle entertainment; e-business including on-line business transactions; and SmartCard transactions. A secure gateway software component 180 also runs in the JVM environment. There may also be non-Java applications 170 running on the second operating system 140, for example a Navigation application.

Thus, the two operating systems are placed on different hardware platforms. The only connection between these hardware platforms, and hence the only link between the vehicle's internal device control units (such as an engine management unit) and the vehicle's communications resources which provide access to external networks, is a single IP-based, serial communications link 190. The gateway software components on the two hardware platforms exclusively control communications across this link.

The Java gateway software component on processing unit B offers one or more public methods that other programs must call in order to access the serial link. The serial link access code is implemented as private, native C code accessible only from within the gateway software component. This can be represented in pseudo code as follows:

```
public class Gateway {
    public int sendToVehicle (Message message, SecurityID requester) {
        // First validate SecurityID
        ...
        // Check requestor is authorised to send this particular Message
        // to vehicle
        String formattedMessage, authorisedRequestor;
        ...
        // Construct formattedMessage, authorisedRequestor
        int returnCode;
        returnCode = sendToSerial (formattedMessage, authorisedRequestor);
        return returnCode;
    }
    private native int sendToSerial (String fMsg, String aRqr);
}
```

The gateway then implements the C code:

```
int sendToSerial (JString formattedMessage, JString authorisedRequestor)
{
    // send message (and optionally requester) across serial link
    ..
``` return successOrFailureCode;

}

Thus, the native C code does the real message sending, and is only accessible through the public sendToVehicle( ) method of the Gateway class. Java version 1.2 (also known as 'Java2') provides increased levels of built-in security (not shown in the pseudo-code) that permits restriction of a program's ability to invoke the sendToVehicle( ) method at all, based on where the program originates.

Figure 2:
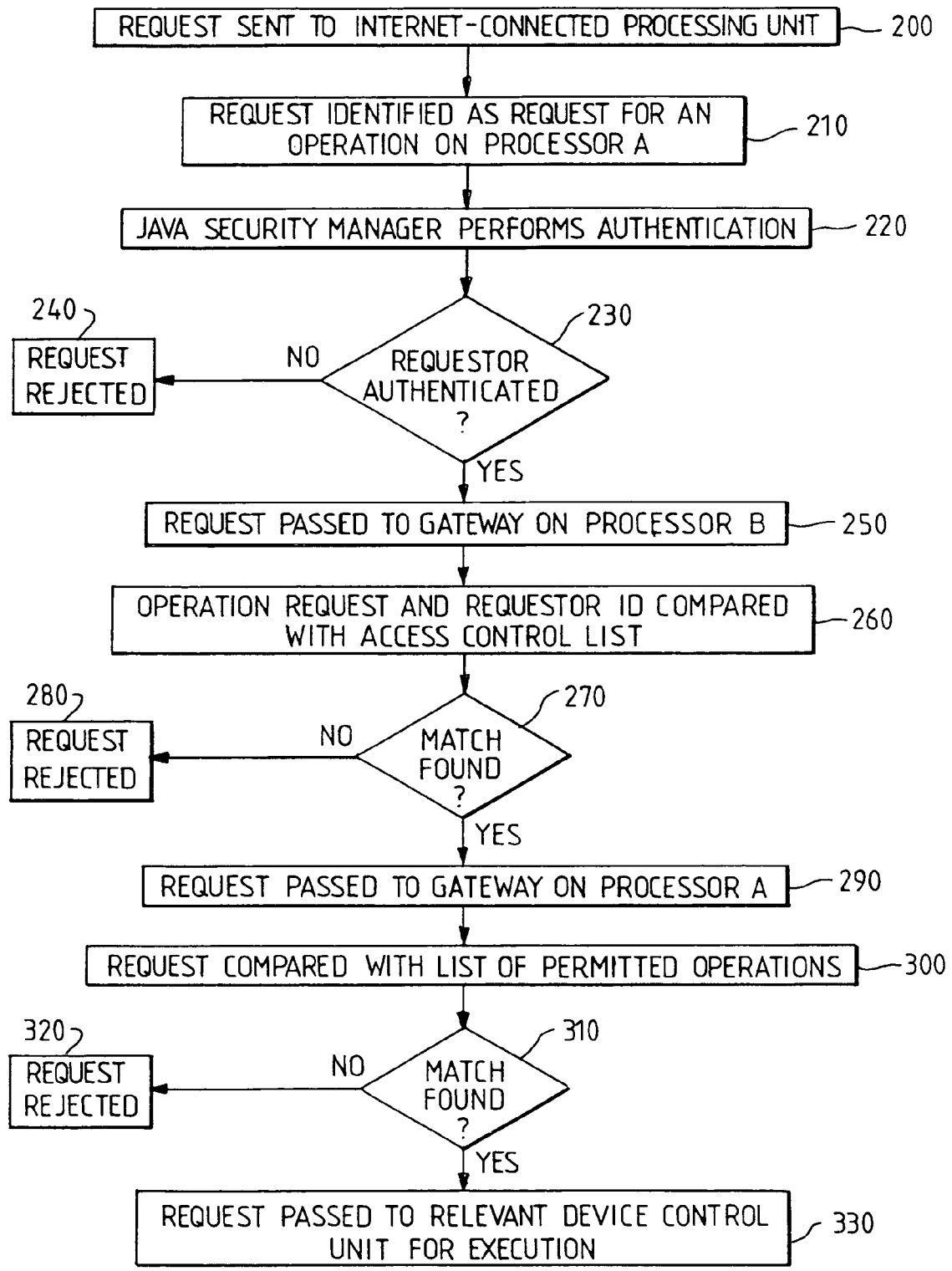
FIG. 2 shows the sequence of operations of processing of an operation request, sent from a remote data processing system, within a vehicle according to FIG. 1.

As noted, the processing unit B which has connections to an external network runs a Java Security Manager. Referring to FIG. 2, when a request 200 is received from outside the vehicle to change any data or code, or to execute any code affecting one of the vehicle's internal device control units, the request has to pass two security barriers:

1. Firstly, the Java Security Manager on the externally connected processing unit B performs authentication 220 (i.e. determining whether the requester is an authorised party). The authentication preferably uses standard public key cryptography and digital signature verification. That is, a message is decrypted using a stored public key and then a digital signature (included in the request by the sender) is compared 230 with a stored signature. A failure to match indicates tampering or impersonation of an authorised party. If the authentication fails, for example because of tampering, the request is rejected 240. This may be an explicit refusal or simple discarding of the request.

If it passes authentication, the request is passed 250 to the gateway component of processing unit B. The gateway then checks 260 predefined authorised parties' permissions, by checking an access control list to determine whether this party (or this program code, downloaded from this location—see later discussion of downloaded code) is permitted to initiate the particular requested operation. The set of requestable operations predefined in the access control lists are completely standard operations, such that requesters can only select an operation at run time and cannot modify any operation (other than to specify operation parameter values from a predefined range of parameter values in cases where there is a need for the flexibility to specify parameter values).

2. If a request is determined 270 to be permitted by reference to the access control lists, the gateway component on processing unit B then sends 290 the request as a message to the gateway component on processing unit A which is connected to the vehicle's internal real-time network of device control units.

This receiving gateway component then checks 300 the message content. If it is a recognised request, matching a list of permitted operations held in ROM and configured in the static operating system (typically an OSEK operating system in Europe) of processing unit A, the request will be forwarded 330 to a respective device control unit which is responsible for the requested function. Note that this is a relatively simple lookup operation. The device control unit then operates in the relevant predefined way. All request messages which are not defined during configuration of the static operating system of processing unit A will be discarded, and so cannot disturb any safety-critical functions on the vehicles internal bus. No changes to this configuration are possible after the vehicle has been manufactured.

In the static, real-time operating system all operations start with a predefined signal, run for a predefined time and then end in a predefined way (for example, an operation may be required to start within 12 instructions of the signal and complete within 20 instructions). This gives behavioural certainty and improves safety, both because of the characteristic reliability and predictability of static operating systems and because they are not tamperable. All operations which are not within the predefined set of permitted operations can be prevented from being performed.

This two-stage security hurdle, and in particular limiting the messages which will be acted on at processing unit A to a predefined set of messages, achieves the high security requirements for vehicles' internal electronic control systems.

The externally-connected processing unit B according to this embodiment of the invention is able to download executable code (for example, Java applets or ActiveX controls implementing engine diagnostic functions) from the Internet. Any such downloaded Java code is checked by the mechanisms of the Java Security Manager running in processing unit B. Firstly, it is checked whether this code was downloaded from a trusted source, such as by checking for a match with the vehicle manufacturer's Internet address and performing digital signature analysis. The Java security mechanisms on processing unit B can restrict the operations which can be performed by downloaded code (but see the later discussion of different versions of Java)—for example only triggering specific predefined engine queries. Having passed these tests, operation requests are sent to the gateway component on processing unit A.

While the network access to processing unit B provides some scope for hackers to try to overcome the security provision of the Java Security Manager (or its equivalent), the second security barrier implemented at processing unit A further reduces risk to safety-critical operations on processing unit A and avoids exposure of confidential information of devices connected to this processing unit A. On receipt of a request message at processing unit A, the request is compared with an unmodifiable list of permitted tasks which is stored at processing unit A as described above. If the requested task is one of the predefined permitted tasks, the request is passed on to the device control unit which is responsible for performing that task. If the requested task is not listed, the request is discarded without being passed to any of the vehicle's device control units. A notification that the requested task will not be executed is preferably sent to the requester.

Thus, if a hacker overcomes the security checks performed at processing unit B and the hacker's unauthorized code generates a task request which is sent to processing unit A, the strict limitation of operations which can be performed in response to such requests prevents any unauthorised manipulation of hardware or software on processing unit A. To execute any process on processing unit A in response to a remote request, one of the set of predefined permitted requests has to be sent via the gateway component and this causes a defined task to be executed in a defined way. No executable code can be passed to processing unit A.

The above discussion of the capabilities of the Java Security Manager assumes that the Java runtime environment includes a security manager of sufficient strength. While this is true of Java 1.2, more limited capabilities are available in Java versions 1.1.X. For example, Java 1.1.x allows for an incoming Applet to be signed, but does not provide certificate-based security as standard. In the case, the functions of the Java Security Manager can be supplemented by complementary program code. Thus, not all versions of the Java Security Manager will perform reliable authentication, but this can be implemented in separate program code. It may also be impossible to rely on the Java Security Manager to check access control lists, although this is within the capabilities of Java 1.2. The Java Security Manager is able to restrict method calls available to downloaded code for applets in Personal Java 1.x, Business Java 1.1.x, and any code in Java 1.2, but not for all embedded Java code.

In an alternative embodiment of the invention, the user authentication step described above is performed at processing unit A rather than at the externally-connected processing unit B. The request is then compared with an unmodifiable list of tasks which are permitted for the identified user, this list being accessible at processing unit A. This alternative embodiment has greater protection from corruption and therefore greater assurance that no tasks will be performed by users who are not authorised to perform those tasks, but also has disadvantages as described below.

In some embodiments of the invention, only the operating system of the first processing unit A will be a Real Time Operating System and in this case CPU cycles on processing unit A will be more valuable than on processing unit B such that it is desirable to minimize the processing which is performed on processing unit A. Secondly, it may be required to use only a small processor in processing unit A to keep costs down. These resource usage issues may be a sufficient justification for performing the authentication of requestors and comparison of the requested operation with their personal list of permitted operations at processing unit B. It is worth noting that the performance of permitted tasks by unauthorised users does not present the same safety exposure as performance of tasks which are not permitted for any user.

In another alternative embodiment of the invention, the external-network-connected gateway's checking of access control lists (which define what messages each user and each program is permitted to send across the serial link to the vehicle's processing unit A) may be the only check which is performed. If a request for an operation matches the user's or program's permitted operations, then the request is sent across the link. Otherwise the request is rejected. The gateway on processing unit A can then simply pass on to the relevant device control units for execution any operation requests which reach it. This has the advantage of minimizing the processing required on the RTOS first processing unit, which can be important if the processing power of this processing unit is sufficiently low that even simple checks cannot be performed in real time, but it requires the access control list on processing unit B to be securely protected from hackers.

Most of the program code on the system other than Java and ActiveX code is installed at system installation rather than being downloaded dynamically. If permitted at all, downloading and dynamic installation of native code is preferably restricted to code from the vehicle manufacturer's own authorised network site. The standard security features are used to authenticate the manufacturer's site and to sign the downloaded code. This signing means that tampered code will be identified and not installed on the vehicle. In this case, the only way to overcome this security would be to install malicious code on the manufacturer's site and to sign it with their secret keys. This sort of attack should be impossible for anyone other than the manufacturer's own authorised employees.

Native code on the network-connected side of the serial link cannot easily access that link. The sendToSerial( ) method is not easily accessible (it would be given a secret name, with its API secret and hidden). Incoming native code would have to know the method's name string in order to invoke the method. Without the name, incoming native code would have to find and access the serial link itself, and know how to find and configure the serial link, and know the protocol used across this link to communicate with the internal processing unit A. In other words, requests to the processing unit A which do not come via the Gateway would need to appear in every way as if they do, which is very difficult to achieve. Other than by a long-running campaign of trial and error (which should be detectable before it is successful), effecting a successful attack should be impossible without privileged access to the original source code.

To really maximize security and prevent unauthorised requestors from initiating operations affecting the vehicle's device control units, authentication and encryption could be used for the messages sent between the two Gateway components, but this would dramatically increase costs because of the processor capabilities required to perform such security checks in real time.

A practical example use of the invention will now be described. consider a car owner who detects that her car has been stolen. The owner contacts her Internet service provider (ISP) and authenticates herself (for example, using a WAP telephone application such as is known in the art, or using confidential information which enables an operator to authenticate her). The owner reports the car theft. The Internet service provider and the car then perform mutual authentication via an exchange of signed and encrypted messages (for example via SMS). The car informs the ISP of its current and recent positions. The ISP informs the car that it has been stolen and that re-starting of the car should be inhibited once turned off. An engine-restart-inhibition application on the external-network-connected processing unit sends a message via the gateway requesting inhibition of restart. The ISP then contacts the police and provides position information. It will be recognised that in this example there is a desire for an operation relating to an engine restart control unit to be initiated from outside the car, and yet it is important that such an operation cannot be initiated by an unauthorised party and it is essential that this operation cannot be modified by hackers to switch off the engine while the car is in use.

As noted previously, alternative embodiments of the invention implement a physical separation of processing units and gateway processes controlling communications between these units in environments other than vehicles, such as in a network-connected home which requires operations relating to protected resources to be invoked from elsewhere in the network. For example, a home owner may wish a washing machine manufacturer to be able to diagnose and service their washing machine and a security company to be able to monitor home security systems while preventing hackers from affecting the operation of the home security system.

What is claimed is:

1. A data processing apparatus for a vehicle, including:
a first data processing unit (A) connected to device control units of the vehicle;
a second data processing unit (B) connected to a communications apparatus providing a wireless connection to an external network, such that operation requests can be received at the second data processing unit (B) from the external network;
a data communications link between the first and second data processing units; and a gateway component for controlling communications across the data communications link, the gateway component limiting passing of the operation requests from the second data processing unit to the vehicle's device control units to only a predefined set of permitted operations.

2. A data processing apparatus according to claim 1, wherein the first data processing unit (A) is adapted to store in an unmodifiable form a list of said predefined set of permitted operations and includes a gateway component for comparing all operation requests received from the second data processing unit (B) with the list of permitted operations, and then to pass the permitted operation requests to respective ones of said device control units and to discard non-permitted operation requests.

3. A data processing apparatus according to claim 2 wherein the first data processing unit (A) includes a static operating system environment and the gateway component of the first data processing unit (A) runs in the static operating system environment.

4. A data processing apparatus according to claim 1, wherein the second data processing unit (B) is adapted to store one or more access control lists defining which operation requests are permitted for particular requesters, and wherein the second data processing unit (B) includes a gateway component for comparing all operation requests on the first data processing unit (A) with the access control lists and only passing to the first data processing unit (A) those operation requests which are permitted for the respective requesters and discarding non-permitted operation requests.

5. A data processing apparatus according to claim 1, wherein:

the first data processing unit (A) includes a Real Time Operating System; and the second data processing unit (B) includes means for performing authentication of requesters and a gateway component for comparing all operation requests sent to the first data processing unit (A) with access control lists and for passing to the first data processing unit (A) only those operation requests which are permitted for the respective requesters and discarding non-permitted operation requests.

\* \* \* \* \*